Patented Aug. 21, 1934

1,970,654

UNITED STATES PATENT OFFICE 1,970,654

SULPHURIC ESTER OF 3.3'-DIFLUORO-DI-ANTHRAHYDROQUINONE-AZINES

Leonard Joseph Hooley, Robert Fraser Thomson, and David Alexander Whyte Fairweather, Grangemouth, Scotland, assignors to Imperial Chemical Industries Limited, a corporation of Great Britain No Drawing. Application October 15, 1931, Serial No. 569,116. In Great Britain October 18, 1930

3 Claims. (Cl. 260—31)

This invention relates to sulphuric esters of 3:3'-difluoro-dianthrahydroquinone-azines.

In a copending application Serial No. 530,724, filed by Fairweather and Thomas, are set forth at length, the various isomeric reduced indanthrones, that is, the enolic compounds theoretically possible by reducing indanthrone or dianthraquinone dihydroazine. In that application there is also given a summary of the sulphuric esters theoretically possible from those reduced indanthrones.

The present application relates to sulphuric esters of reduced indanthrones which contain fluorine as a substituent attached to the indanthrone nucleus. The present sulphuric esters may be obtained by alkaline oxidation of sulphuric esters of 2-amino-3-fluro-anthrohydroquinone. These dyestuffs may be represented by the following formula:

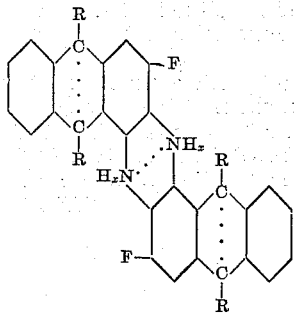

wherein R represents keto or sulphuric ester groups, at least two of the substituents designated by said R being sulphuric ester groups and in which $x$ is zero or one.

The tetra-ester obtainable by the oxidation of the di-ester of 3-fluoro-2-aminoanthrahydroquinone has not hitherto been described and we have now found that it presents considerable interest and possesses great usefulness on account of its enhanced water-solubility as compared with brown tetra-esters of the indanthrone series.

The invention is illustrated by the following example, relating to 3-fluoro-2-aminoanthrahydroquinone. The parts and percentages are by weight.

Example 1

2-amino-3-fluoro-anthraquinone, which may be prepared by the process of U. S. Patent No. 1,857,252 is acetylated by heating with acetic anhydride in acetic acid. The resulting product has a melting point of 252–259° C. and is presumably 2-acetylamino-3-fluoro-anthraquinone. 34 parts of this body are mixed with 170 parts of pyridine and 85 parts of pyridine sulphur tri-oxide. The temperature is raised with good stirring to 80° C. and 27 parts of copper bronze powder are gradually added. Thereafter, the mixture is stirred at 80° C. for 3 hours. It is then steam-distilled with 56 parts of sodium carbonate in aqueous solution and filtered from copper residues. The filtrate is treated with 27 parts of slaked lime and 5 parts of caustic soda at the boil for 45 minutes, and filtered from chalk.

The solution is dark brown and has strong green fluorescence when diluted. On acidification with hydrochloric acid and addition of sodium nitrate a red violet color is obtained.

From the solution, which should not exceed 450 to 500 parts, golden crystals can be precipitated by the addition of potassium chloride. These crystals appear to consist of the disulphuric ester of 2-amino-3-fluoro-9:10-dihydroanthraquinone. This disulphuric ester has the probable formula

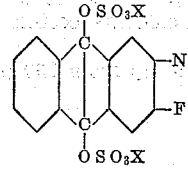

wherein X is a metal.

The solution so obtained is cooled to 5° C. and 110 parts of sodium hypochlorite solution (11.7 per cent. NaOCl) are run in with rapid stirring. The temperature will be found to rise to about 15° C., stirring is continued for 15 minutes, and then a solution formed by neutralizing 10 parts of sodium bi-sulphite solution of about 35 per cent strength with 20 per cent. sodium hydroxide solution is added. To this liquor there are then added 150 parts potassium chloride, and the material thus precipitated is filtered off and washed on the filter with 100 parts of saturated potassium chloride solution.

To the combined filtrates and washings there are added 130 parts of caustic potash, and the whole is allowed to cool. The precipitate is filtered off and sucked dry. The filter cake is stirred for one hour at 60° C. with 180 parts of ethyl alcohol and 10 parts of caustic potash, and the mass is filtered cold, the cake being washed with ethyl alcohol containing a trace of caustic potash until the runnings are colorless.

The product so obtained, which appears to be the tetra-sulphuric acid ester of 3:3'-difluoro-tetra-hydrodianthraquinone azine, is stored as an aqueous, slightly alkaline, paste. This tetra-ester, in the form of the potassium salt, may be represented by the following formula

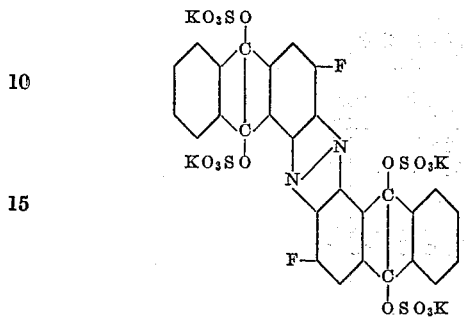

It is very soluble in water giving a brownish yellow solution which shows an intense green fluorescence when dilute. If a mineral acid be added to the solution, the color changes at once and a blue-violet precipitate appears: this is apparently the disulphuric acid ester of 3:3'-difluoro - dihydro-dianthraquinone dihydroazine. This disulphuric ester, in the form of the potassium salt, may be represented by the following formula

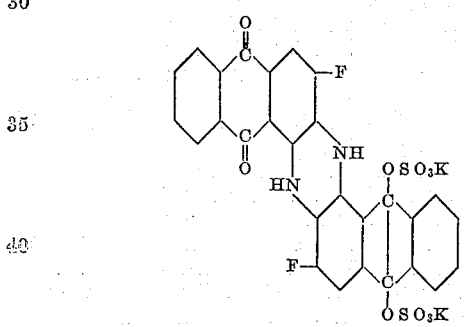

*Example 2*

This is an example for the use of the product of Example 1 for coloring cotton by a padding method.

The bath is made up from 100 parts water, 10 parts of a 20 per cent paste of the product of the previous example and 6 parts of a 6 per cent solution of gum tragacanth. The cotton is padded in this bath at ordinary temperature and then squeezed and dried. It is then developed by the method of Example 3 of Fairweather and Thomas, Application Serial No. 501,160, dated 9th December, 1930.

As many apparently widely different embodiments of this invention may be made without departing from the spirit and scope thereof, it is to be understood that we do not limit ourselves to the specific embodiments thereof except as defined in the appended claims.

We claim:

1. A sulphuric ester of 3:3'-difluoro-dianthraquinone-azines, having the formula

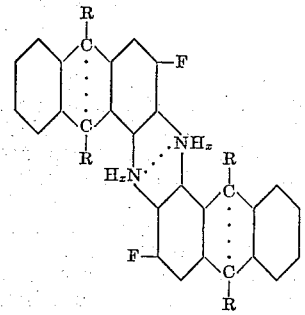

wherein R represents keto or sulphuric ester groups, at least two of the substituents designated by said R being sulphuric ester groups, and in which $x$ is zero or one.

2. The tetra-sulphuric acid ester of 3:3'-difluoro-tetra-hydro dianthraquinone-azine, said tetra-ester being very soluble in water giving a brownish yellow solution which shows an intense green fluorescence when diluted, said solution upon the addition of mineral acid immediately changing color and yielding a blue-violet precipitate.

3. The disulphuric ester of 3:3'-difluoro-dihydrodianthraquinone dihydro-azine.

ROBERT FRASER THOMSON.
LEONARD JOSEPH HOOLEY.
DAVID ALEXANDER WHYTE
FAIRWEATHER.